March 24, 1970  K. SILVON  3,502,122
OSCILLATING SHARPENER
Filed Oct. 21, 1966
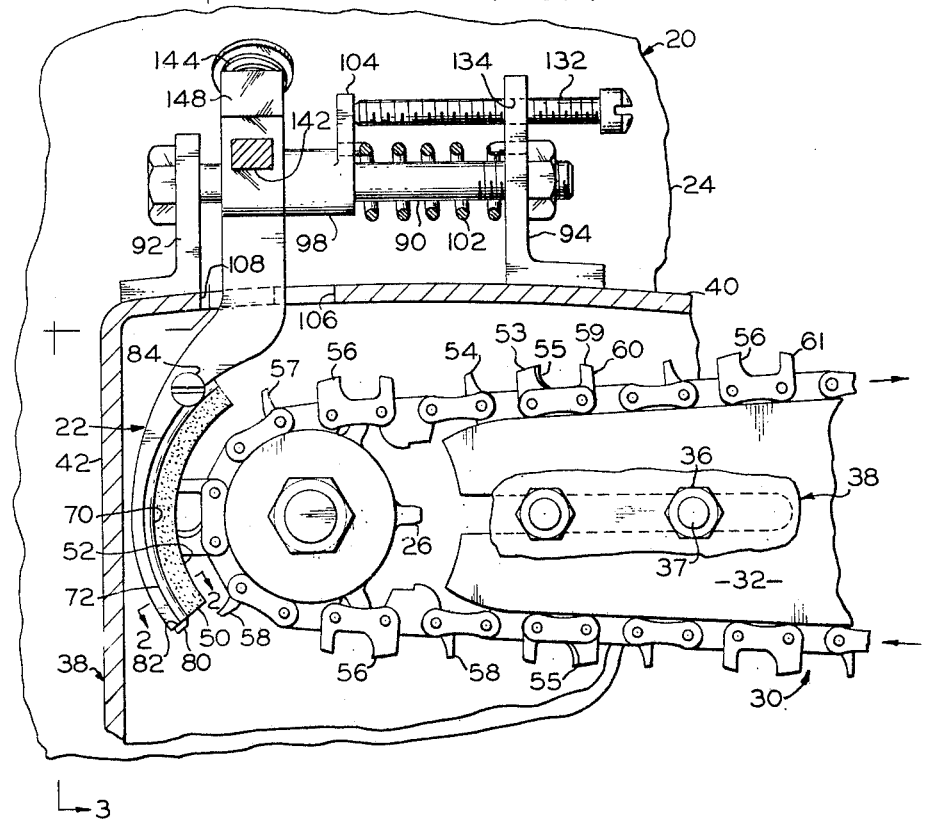
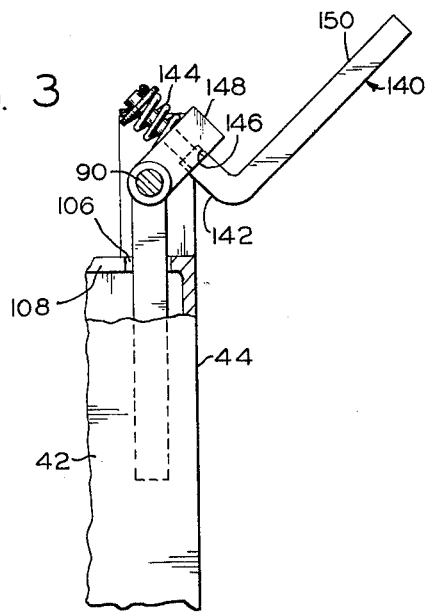
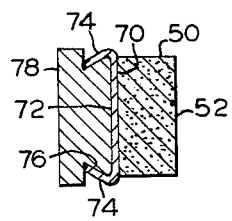
KAY SILVON
INVENTOR
BY
BUCKHORN, BLORE, KLARQUIST & SPARKMAN
ATTORNEYS

United States Patent Office 3,502,122
Patented Mar. 24, 1970

3,502,122
OSCILLATING SHARPENER
Kay Silvon, Portland, Oreg., assignor to Omark Industries, Inc., Portland, Oreg., a corporation of Oregon
Filed Oct. 21, 1966, Ser. No. 588,449
Int. Cl. B27d 17/08
U.S. Cl. 143—32       12 Claims

ABSTRACT OF THE DISCLOSURE

The sharpener is an assembly which may be quickly attached and detached from the frame of a chain saw and sharpens the saw chain as it travels around the drive sprocket for the chain. A carrier arm is slidable along a guide rod on a sprocket cover to advance a sharpening member toward tips of a saw chain as limited by an adjustment screw. The carrier arm also is pivotal on the guide rod to dress the sharpening member.

---

This invention relates to a sharpener for a chain saw, and more particularly to an oscillating sharpener for a chain saw.

An object of the invention is to provide a new and improved sharpener for a chain saw.

Another object of the invention is to provide an oscillating sharpener for a chain saw.

A further object of the invention is to provide a sharpener for a chain saw which has a sharpening member pivotal from a retracted position out of the projected area of a saw chain to an operative position in the projected area of the saw chain.

Another object of the invention is to provide a sharpener for a chain saw in which a sharpening member is mounted for pivotal movement for dressing thereof and for linear movement toward a saw chain to be sharpened.

The invention provides a sharpener for a chain saw in which a sharpening member is mounted on the chain saw for pivotal dressing movement relative to a saw chain thereof. Preferably the sharpening member is mounted on a carrier arm which is pivotal on a guide rod for dressing movement of the sharpening member and is slidable on the guide rod for moving the sharpening member toward and away from the saw chain. Preferably the carrier arm is both urged back along the guide rod and is pivoted toward a storage position by a combined torsion and compression spring mounted on the guide rod. The guide rod preferably is mounted on a pair of brackets mounted on a cover removably carried by the saw. An adjustment screw may be provided on one of the brackets for engagement by the carrier arm to limit the movement of the carrier arm in moving the sharpening member toward the saw chain in its sharpening feed, and a handle is preferably mounted pivotally on the carrier arm for movement between a folded storage position and an unfolded operating position.

A complete understanding of the invention may be obtained from the following detailed description of a sharpener for a chain saw forming a specific embodiment thereof, when read in conjunction with the appended drawings, in which:

FIG. 1 is a fragmentary vertical sectional view of a chain saw and a sharpener forming one embodiment of the invention;

FIG. 2 is an enlarged, generally horizontal sectional vew taken along line 2—2 of FIG. 1; and FIG. 3 is a vertical sectional view taken along line 3—3 of FIG. 1.

Referring now in detail to the drawings, a chain saw 20 mounts a sharpener 22 forming one specific embodiment of the invention. The sharpener is an assembly which may be quickly attached to and detached from a main casting or frame 24 which may include the casting of an engine or motor serving as the source of motive power for the chain saw and serving to rotate a drive sprocket 26 through a known clutch member (not shown) in a clockwise direction, as viewed in FIG. 1. The sprocket advances endless saw chain 30 around the drive sprocket and a saw bar 32 having a nose portion (not shown) of substantially greater diameter than that of the drive sprocket. The saw bar is attached rigidly to the frame 24 by nuts 36 threaded on studs 37 which form quick-releasable attachment means for the saw bar and for a cover 38. The cover 38 forms the body or frame of the sharpener 22 and also serves to cover the drive sprocket. The cover 38 has a tap flange 40 and a rear flange 42 integral with body portion 44.

A sharpening member 50 has an elongated, concavely arcuate, sharpening surface 52 forming a part of a cylinder, the radius of which is equal to the radius of the path of travel of arcuate tips 53 of teeth 54 and 58 and arcuate tips 59 of depth gauges 60 and 61 of the saw chain 30. The teeth are each positioned to the rear of the midpoint of a line joining the pivot points of the link on which the tooth is mounted. The sharpening member is bonded by a suitable, well known adhesive to arcuate face 70 of a shoe 72. The face 70 forms a portion of a cylinder and is concentric with the arcuate sharpening surface 52. The shoe 72 has arcuate flange 74 forming an arcuate dovetail groove adapted to fit closely and slidably on arcuate dovetail portion 76 of arm 78. The shoe also has an end tab or stop 80 adapted to engage end 82 of the arm 78 to limit movement of the shoe relative to the arm 78 in a clockwise direction as viewed in FIG. 1, which direction is the same as that in which the saw chain 30 is advanced around the sprocket 26. A slotted head of a screw 84 threaded into a tapped bore in the arm 78 engages the adjacent portion of the shoe and clamps the shoe tightly in assembled position on the arm 78.

The arm 78 is mounted for oscillating or swinging movement on a guide rod 90 rigidly mounted on brackets 92 and 94 fixed rigidly on the top flange 40 of the cover 38. The rod 90 extends parallel to and substantially in the plane of the chain 30, the sprocket 26 and the saw bar 32.

The arm 78 has a sleeve or bearing portion 98 fitting closely, slidably and rotatably on the rod 90. A combined torsion and compression spring 102 is secured at one end to a lug 104 fixed to the arm 78 and at the other end to the bracket 94. The spring urges the arm 78 to the left, as viewed in FIG. 1, along the rod 90 and counterclockwise, as viewed in FIG. 3, about the rod 90 toward a storage position in which the arm 78 and the sharpening member 50 are substantially completely out of the plane of the saw chain 30. In the storage position, the sharpening member 50 also has been swung back away from the path of the saw chain. The arm extends through an L-shaped guide slot 106 having an enlarged end portion 108 to permit the arm to be swung by the spring 102 to its storage position. The righthand end portion of the slot, as viewed in FIG. 1, is narrow and holds the arm for limited oscillation laterally of the plane of the saw chain for fully dressing the sharpening member 50 while keeping the sharpening member in the plane of the saw chain. That is, just sufficient oscillation of the sharpening member is permitted for the member to move between a first extreme in which one side thereof is just inside the adjacent edge of the path of the teeth 55 to the other extreme in which the other side of the member is just inside the adjacent edge of the path of the teeth 56.

An adjustment screw 132 threaded through a tapped bore 134 in the bracket 94 is positioned in alignment with the lug 104 and acts as a stop to limit the sharpening cut of each sharpening operation and to stabilize the arm 78 and member 50 during the sharpening. A handle 140 having a square shank portion 142 is urged upwardly and to the left, as viewed in FIG. 2, by a compression spring 144 to tend to seat the shank portion in square socket 146 in arm portion 148. The arm portion 148 is integral with the arm 78. The handle may be seated in the socket either in an operating position as shown in FIG. 2, in which handle portion 150 extends upwardly and outwardly from the cover 38, or a storage position in which the handle portion extends along the cover 38 and is near to the cover.

OPERATION

In the operation of the sharpener 22, the operator sets the screw 132 to limit the extent of sharpening to be effected and turns the handle 140, if necessary, to its operating position. Then, with the engine running to rotate the sprocket 26 clockwise, as viewed in FIG. 1, the operator swings the arm 78 out into the plane of the saw chain 30 and then slides the arm 78 along the guide rod 90 to move the sharpening member 50 into sharpening engagement with the chain and slowly oscillates the arm to dress the sharpening member as the sharpening proceeds. After the lug 104 engages the adjustment screw 132 and flexibility and play are removed, the desired extent of sharpening has been made and the handle 140 is released. The spring 102 then moves the arm 78 back away from the saw chain and swings the arm to its storage position in which the arm 78 is substantially completely out of the plane or projected area of the chain.

The sharpening surface 52 is of such a width relative to the kerf width of the chain and the extent of oscillation of the sharpening member 50 permitted by the slot 106 is such that, during the dressing of the surface 52, the entire surface 52 is dressed while each side of the sharpening member is never moved laterally into the path of the saw chain as far as the width of the side slitter teeth 57 or 58 on the side of the chain adjacent to said side of the sharpening member. The sharpening surface 52 may be of constant width or it may taper from wider at the lower end thereof to narrower at the upper end thereof to compensate for the different distances of oscillation of the upper and lower portions of the member 50 during dressing of the surface, the taper preferably being such that, when the arm is at either limit of its oscillation, one side of the member 50 is just inside the adjacent side of the path of the tips of the chain teeth and is parallel to that side of the path.

The above-described sharpener 30 is simple and compact, and may be installed on an existing chain saw merely by substituting the cover 38 with the sharpener 22 for the cover of the chain saw. The sharpener provides for full dressing movement of the sharpening member and for linear feed of the sarpening member in the sharpening direction.

It is to be understood that the above-described arrangements are simple illustrative of the application of the principles of the invention. Numerous other arrangements may be readily devised by those skilled in the art which will embody the principles of the invention and fall within the spirit and scope thereof.

What is claimed is:
1. In a chain saw,
a main frame,
a drive sprocket rotatably mounted on the main frame,
a saw chain in a predetermined plane and driven by and coursing around the drive sprocket,
means guiding the saw chain along a predetermined path including an arcuate portion,
an elongated, arcuate, abrasive sharpening member having a concave, cylindrical sharpening surface,
a guide rod secured relative to the main frame in a position extending parallel to said plane,
an arm carrying the sharpening member and having an elongated guide portion mounted pivotally on and slidably along the guide rod, and
means for moving the arm along the guide rod to move the sharpening member linearly into engagement with the saw and pivotally back and forth across the saw chain to sharpen the saw chain and dress the sharpening member.

2. The chain saw of claim 1 including handle means connected to the arm for pivoting and sliding the arm relative to the guide rod.

3. In a chain saw,
a main frame,
a drive sprocket rotatably mounted on the main frame,
a saw chain in a predetermined plane and driven by and coursing around the drive sprocket,
means guiding the saw chain along a predetermined path including an arcuate portion,
a sharpening member,
a guide rod secured relative to the main frame in a position extending parallel to said plane,
an arm carrying the sharpening member and mounted pivotally on and slidably along the guide rods,
a cover adapted to cover the drive sprocket,
means for detachably mounting cover on the main main frame,
means mounting the guide rod on the cover, and
means for moving the arm to move the sharpening member linearly into engagement with the saw and pivotally back and forth across the saw chain to shapen the saw chain and dress the sharpening member.

4. The chain saw of claim 3 wherein the cover is provided with a slot through which the arm extends, the slot being of a length sufficient to permit movement of the arm along the rod and being in a width sufficient to permit pivotal movement of the arm on the guide rod.

5. The chain saw of claim 3 including a bracket mounted on the cover, and adjustment screw means for engaging the arm to control the depth of cut of the sharpening member.

6. The chain saw of claim 1 including adjustable stop means for limiting movement of the arm toward the chain to limit the sharpening cut.

7. The chain saw of claim including means fixed relative to the frame for limiting pivotal dressing movement of the arm relative to the guide means and permitting a range of the pivotal dressing movement between extremes in which both sides of the sharpening member move inside the adjacent edges of the path of the tips of the teeth of the saw chain.

8. In a chain saw,
a main frame,
a drive sprocket rotatably mounted on the main frame,
a saw chain in a predetermined plane and driven by and coursing around the drive sprocket,
means guiding the saw chain along a predetermined path including an arcuate portion,
a sharpening member,
a guide rod secured relative to the main frame in a position extending parallel to said plane,
an arm carrying the sharpening member and mounted pivotally on and slidably along the guide rod,
means for moving the arm to move the sharpening member linearly into engagement with the saw and pivotally back and forth across the saw chain to sharpen the saw chain and dress the sharpening member, and
a combined torsion and compression spring mounted on the guide rod and fixed at one end to the arm and fixed at the other end thereof against movement relative to the frame.

9. In a chain saw,
a main frame,
a drive sprocket rotatably mounted on the main frame,
a saw chain in a predetermined plane and driven by and coursing around the drive sprocket,
means guiding the saw chain along a predetermined path including an arcuate portion,
a sharpening member,
guide means secured relative to the main frame in a position extending parallel to said plane,
an arm carrying the sharpening member and mounted pivotally on and slidably along the guide means,
means for moving the arm to move the sharpening member linearly into engagement with the saw and pivotally back and forth across the saw chain to sharpen the saw chain and dress the sharpening member,
a cover adapted to cover the drive sprocket,
means for detachably mounting the cover on the main frame,
means mounting the guide means on the cover, and
a combined torsion and compression spring urging the arm toward a retracted position out of the projected area of the saw chain.

10. In a chain saw,
a main frame,
a drive sprocket rotatably mounted on the main frame,
a saw chain in a predetermined plane and driven by and coursing around the drive sprocket,
means guiding the saw chain along a predetermined path including an arcuate portion,
a sharpening member,
guide means secured relative to the main frame in a position extending parallel to said plane,
an arm carrying the sharpening member and mounted pivotally on and slidably along the guide means,
and actuating means for moving the arm to move the sharpening member linearly into engagement with the saw and pivotally back and forth across the saw chain to sharpen the saw chain and dress the sharpening member,
the actuating means including a handle having a shank having a splining portion and a rotatable portion,
the arm having a bore therein mounting the rotatable portion slidably and rotatably, the arm also having a splining socket adapted to key to the splining portion when the splining portion is inserted therein and to permit rotation of the shank when the splining portion of the shank is not in the splining socket,
the shank being slidable in the bore between a first position in which the splining portion is in the splining socket and a second position in which the splining portion is out of the splining socket.

11. The chain saw of claim 1 including a cover detachably secured to the main frame in a position covering the sprocket and carrying the guide rod in said position extending parallel to said plane.

12. In a chain saw,
a main frame,
a drive sprocket rotatably mounted on the main frame,
a saw chain in a predetermined plane and driven by and coursing around the drive sprocket,
means guiding the saw chain along a predetermined path including an arcuate portion,
a sharpening member,
a guide rod secured relative to the main frame in a position extending parallel to said plane,
an arm carrying the sharpening member and mounted pivotally on and slidably along the guide rod,
means for moving the arm to move the sharpening member linearly into engagement with the saw and pivotally back and forth across the saw chain to sharpen the saw chain and dress the sharpening member, and
spring means biasing the arm toward one end of the rod.

References Cited
UNITED STATES PATENTS

| | | | |
|---|---|---|---|
| 3,138,973 | 6/1964 | Muir | 143—32 X |
| 3,147,644 | 9/1964 | Oehrli | 143—32 X |

DONALD R. SCHRAN, Primary Examiner

U.S. Cl. X.R.

76—37

PO-1050
(5/69)

UNITED STATES PATENT OFFICE
CERTIFICATE OF CORRECTION

Patent No. 3,502,122  Dated March 24, 1970

Inventor(s) Kay Silvon

It is certified that error appears in the above-identified patent and that said Letters Patent are hereby corrected as shown below:

Column 1, lines 33, 34 "prejected" should be -- projected -- .

Column 4, line 27, after "mounting" should be inserted -- the -- ;

line 27, "main" should be canceled;

line 38, "in" should be -- of -- ;

line 48, after "claim" should be inserted -- 1 -- .

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents